United States Patent [19]

Yamashita

[11] Patent Number: 4,989,105
[45] Date of Patent: Jan. 29, 1991

[54] CASSETTE TAPE PLAYER

[75] Inventor: Manabu Yamashita, Iwaki, Japan

[73] Assignee: Alpine Electronics Inc., Tokyo, Japan

[21] Appl. No.: 239,101

[22] Filed: Aug. 31, 1988

[30] Foreign Application Priority Data

Dec. 14, 1987 [JP] Japan .................................. 62-189696

[51] Int. Cl.⁵ ............................................ G11B 15/675
[52] U.S. Cl. .................................................... 360/96.5
[58] Field of Search ......................... 360/96.5, 96.6, 85

[56] References Cited

U.S. PATENT DOCUMENTS

| | | | |
|---|---|---|---|
| 4,424,540 | 1/1984 | Naoi | 360/71 |
| 4,740,856 | 4/1988 | Yoshii et al. | 360/96.5 |
| 4,796,117 | 1/1989 | Fleck | 360/96.5 |
| 4,799,117 | 1/1989 | Ohyama | 360/96.5 |

Primary Examiner—Robert S. Tupper
Attorney, Agent, or Firm—Guy W. Shoup; Paul J. Winters

[57] ABSTRACT

An improvement of a tape cassette ejecting mechanism is disclosed in which a tape cassette with a malfunctioning lid can be properly ejected. A lid closing device is provided for closing a malfunctioning lid of a tape caassette. An arm is also provided for bringing the tape cassette up to a manually accessible position upon pushing of the arm.

3 Claims, 8 Drawing Sheets

CASSETTE TAPE PLAYER

FIELD OF THE INVENTION

The present invention relates to a digital audio tape player, particularly to an ejecting mechanism which is effectively activated when the tape cassette does not properly function.

BACKGROUND OF THE INVENTION

Figure 1:
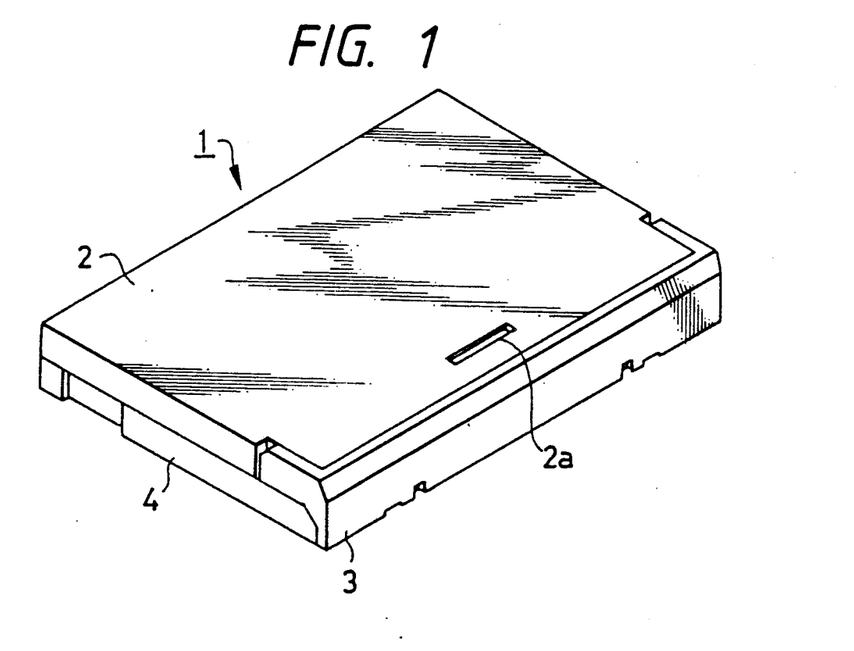
FIGS. 1 and 2 show perspective views of tape cassettes which are used in a digital audio tape player.
Figure 2:
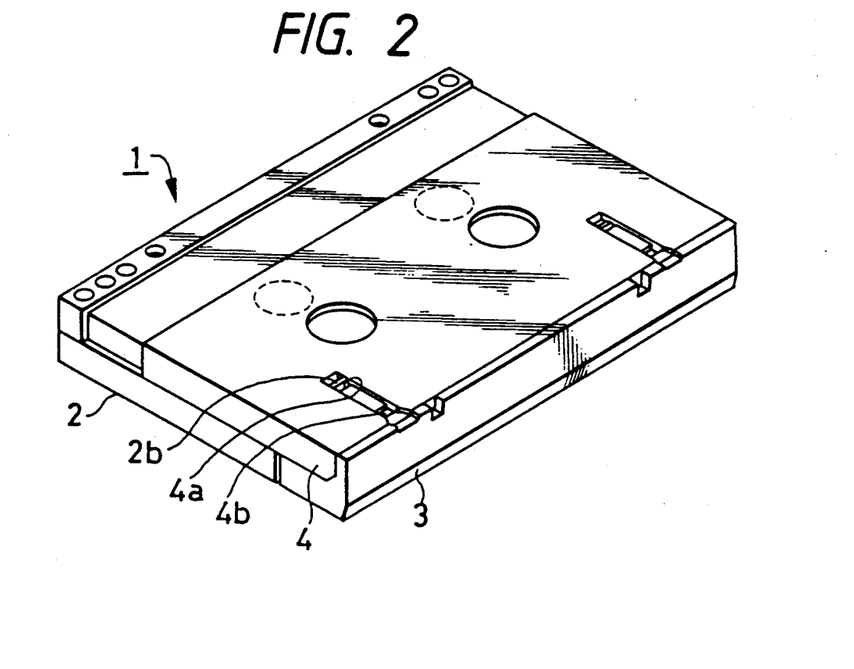

Generally a digital audio tape player uses a tape cassette 1 as shown in FIGS. 1 and 2. The tape cassette 1 is made of a material such as ABS resin so as to accommodate a magnetic tape. The tape cassette 1 is provided with: a receiving portion 2 having an engaging groove 2a for engaging an engaging roll of a cassette moving section described below, a lid 3 pivotally supported by a shaft at the front of the receiving portion 2, and a slider 4 which adds strength to the lid 3 and slides along the bottom surface of the receiving portion 2. The slider 4 is provided with a first engaging hole 4a for engaging slider lock claw 2b when slider 4 is positioned at the front of cassette 1. The slider lock claw 2b is integrally formed with the receiving portion 2. The slider lock claw 2b presses toward the slider 4 at all times owing to its elasticity, and therefore, if no external force is applied, lock claw 2b engages the first engaging hole 4a. The slider 4 is also provided with a second engaging hole 4b for engaging the slider lock claw 2b when the slider is moved to the rear of cassette 1. In this position, a hole 4c (not shown) of slider 4 corresponds to a tape hub 2c (not shown) around which the tape is wound.

Thus the slider lock claw 2b always presses toward the slider 4 owing to its elasticity, and can be separated from the slider only when an external force is applied. However, if the original elasticity of the slider lock claw 2b is too weak, or if lock claw 2b has lost its elasticity after extended use, the slider lock claw 2b and the first and second engaging holes cannot properly engage. In this case the slider 4 can move into the pivoting track of the lid 3 and impede the closing of the lid. If the lid 3 cannot close, the cassette must be manually removed from the cassette moving section of the tape player which is incapable of ejecting the tape cassette.

SUMMARY OF THE INVENTION

It is the object of the present invention to provide a tape cassette ejecting mechanism which is capable of ejecting any tape cassette with the detrimental lid features described above, and therefore overcomes the disadvantages of the prior art.

In order to achieve the above object, the present invention provides a lid closing device which will close the lid no matter what kind of tape cassette is used, thereby enabling ejection of the tape cassette. The lid closing device operates as follows. When the tape cassette is ejected, if the lid is open, the lid is forcibly pressed closed so that any tape cassette which has lost the slider-locking effect can be easily removed from the digital audio tape player.

DETAILED DESCRIPTION OF THE INVENTION

Figure 3:
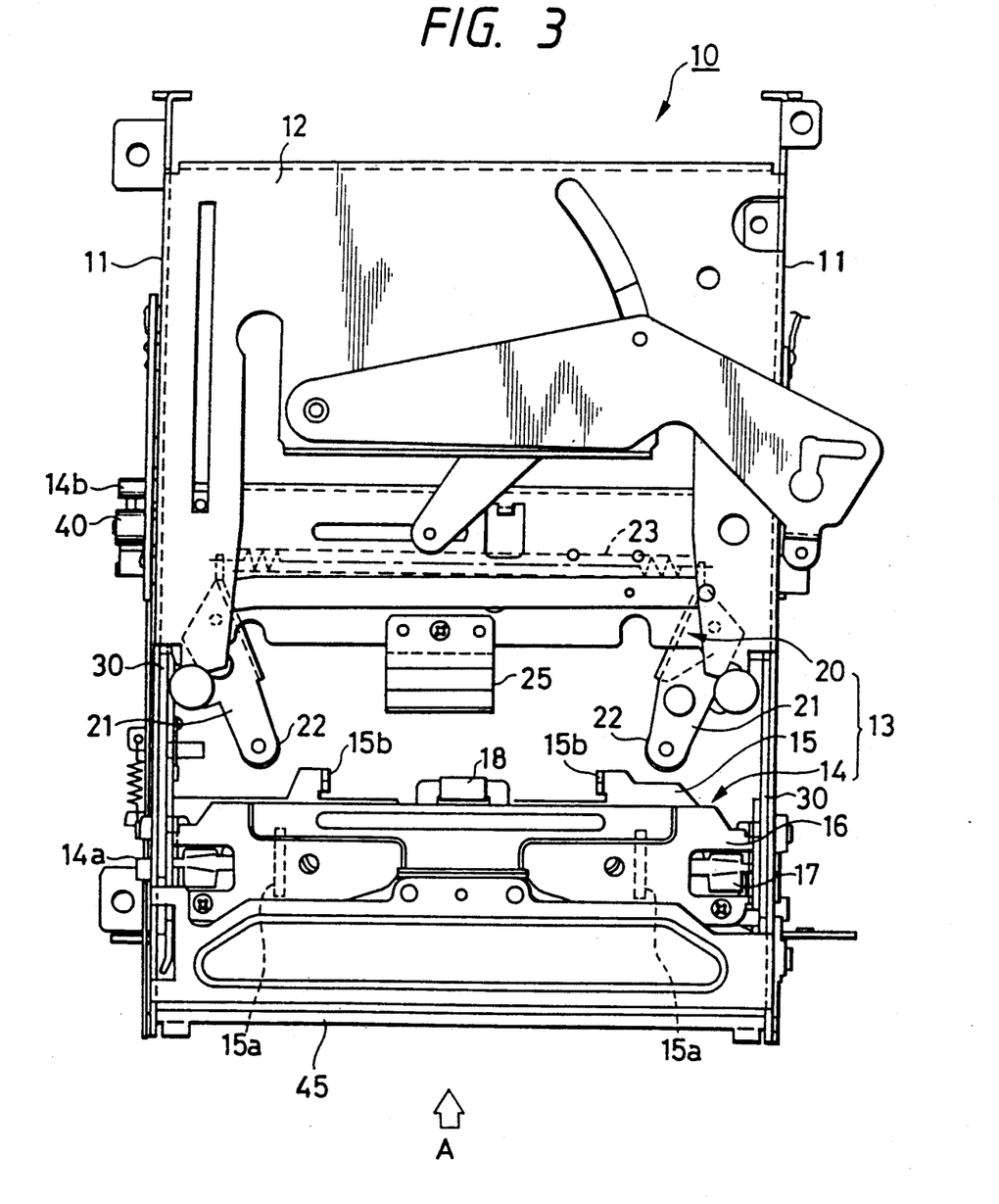
FIG. 3 is a plan view of the cassette moving mechanism of the present invention.

The above object and other advantages of the present invention will become apparent from the description of the preferred embodiment with reference to the drawings. FIG. 3 is a plan view showing the internal mechanism of a digital audio tape player. Reference no. 10 indicates a moving mechanism attached to a first chassis (not shown) and supporting a capstan, a rotary head, and the like, in order to carry out recording, reproduction, etc. on the tape of a tape cassette. The moving mechanism 10 slidably moves side chassis 11 upstanding from the opposite sides of the first chassis, and a top chassis 12 integrally formed with the upper section of the side chassis 11, so that a cassette moving section 13 can move the tape cassette 1 to the position where recording and reproduction can be performed. Thus, the cassette moving mechanism 10, by means of the cassette moving section 13, keeps the tape cassette 1 in a position where various functions such as recording and reproduction can be carried out.

The cassette moving section 13 is described below in more detail. Reference no. 14 indicates a holder for moving and keeping the tape cassette 1 in its proper position. The holder 14 is provided with lock releasing protrusions 15a which are parallel to the direction for inserting the tape cassette 1, indicated by arrow A. Protrusions 15a are formed to release the engagement between the slider lock claw 2b and the first engaging hole 4a when the tape cassette 1 is being inserted into a lower portion 15, and to release the engagement between the slider lock claw 2b and the second engaging hole 4b when the tape cassette is being ejected by contacting the slider 4. The holder 14 is also provided with a slider moving claw 15b which is formed by bending a part of holder 14. Slider moving claw 15b slidably moves the slider 4 toward the rear of the tape cassette 1. The holder 14 is also provided with a spring 17 which is attached to an upper portion 16 coupled with the engaging groove 2a of the tape cassette 1. The spring 17, being bent downwardly, can exert a resilient force at both sides of the tape cassette 1 in order to push the tape cassette 1 downward. A cylindrical engaging roll 18 for engaging the engaging groove 2a is installed on the spring 17.

Reference no. 20 indicates a second holder which is interlocked with the holder 14, and which is provided with two pivotal arms 21 at opposite ends thereof for ejecting the tape cassette 1. A cylindrical push roll 22 is rotatively installed at one end of each arm 21 in order to push the lid 3 of the tape cassette 1 when the tape cassette 1 is ejected. The end of the arm 21 having the cylindrical push roll 22 is forced in a direction away from the center. Therefore, the other end of each arm 21 is elastically connected to a tension spring 23, so that when the end of the arm 21 having the cylindrical push roll 22 is pushed down by the cylindrical push roll 22 during the insertion of the tape cassette 1, the second holder 20 can be easily pivoted toward the center.

Reference no. 25 indicates a lid closing device for forcibly closing the lid 3 when lid 3 is opened but should be closed. As shown in FIGS. 4-7, the lid closing device 25 is provided with a handle on its left top at the end of the U-shaped cross section, and its right side is bent in an extending direction. The handle is fastened to the approximate center of the second holder 20.

In the case where the lid closing device 25 is made of the same rigid material as that of the second holder 20, the lid closing device 25 can be integrally formed with second holder 20 by a machine press, thereby eliminating an assembly step. However, if the lid closing device 25 is made of a soft material, the lid 3 cannot be damaged, even if contact is maintained during the closing of the lid. This simplifies the designing of the device by eliminating the need to consider the timing of lid closing and the like.

Figure 8:
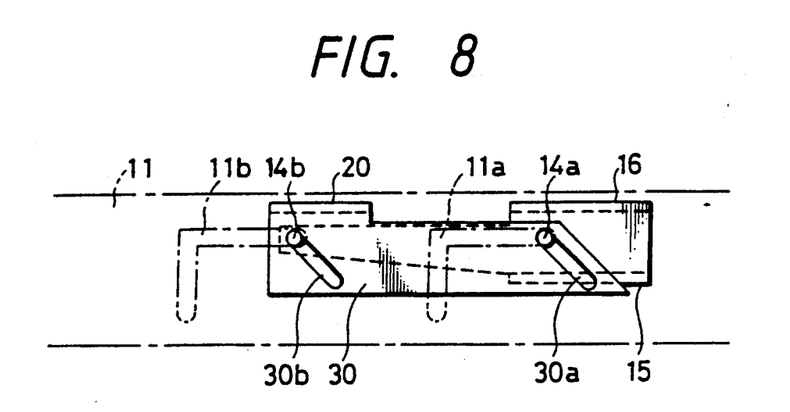
FIGS. 8 and 9 illustrate the movements of the cassette moving mechanism.
Figure 9:
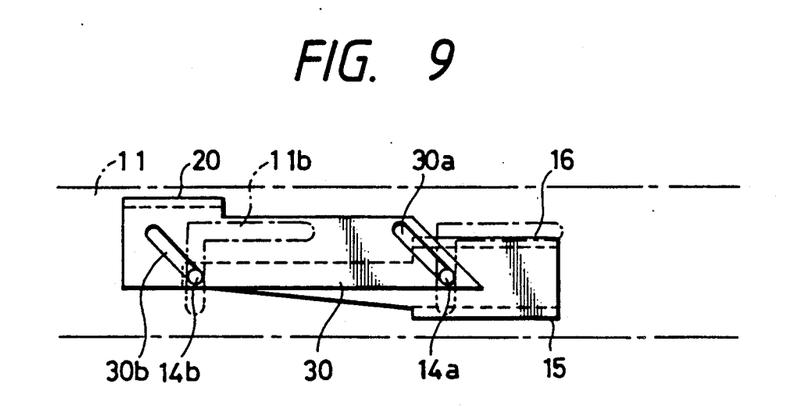

As shown in FIGS. 8 and 9, reference no. 30 indicates an interlocking lever for interlocking the holder 14 and the second holder 20. Interlocking lever 30, being integrally formed with the second holder 20, is provided with parallel grooves 30a and 30b which receive holder shafts 14a and 14b which are fixedly attached to the holder 14. The holder shafts 14a and 14b are also received into slots 11a and 11b which are both formed with a portion parallel to the side chassis 11 and a portion transverse to the side chassis 11. Further, the holder shaft 14b is attached to the side chassis 11, and can activate a start switch 40 for driving the cassette moving section 13 by a motor (not shown). The start switch 40 is turned to the OFF position if it is pressed down, and to ON position if it is released.

Figure 10:
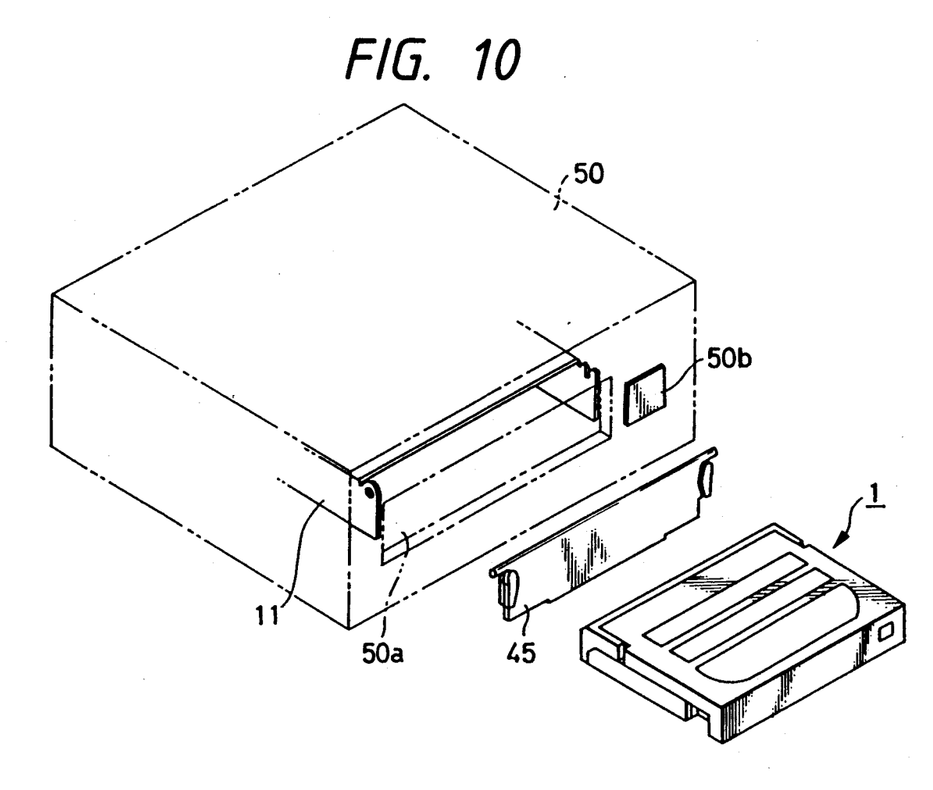
FIG. 10 shows the position of the cassette moving mechanism within the digital audio tape player.

The digital audio tape player is accommodated in a case 50 which is provided with an opening 50a for inserting the tape cassette 1, and an eject button 50b for ejecting the tape cassette 1, as shown in FIG. 10. The moving mechanism 10, including the cassette moving section 13 described above, are also enclosed in the case 50. The digital audio tape player records or reproduces audio signals on a magnetic tape 5 installed within the cassette.

Figure 4:
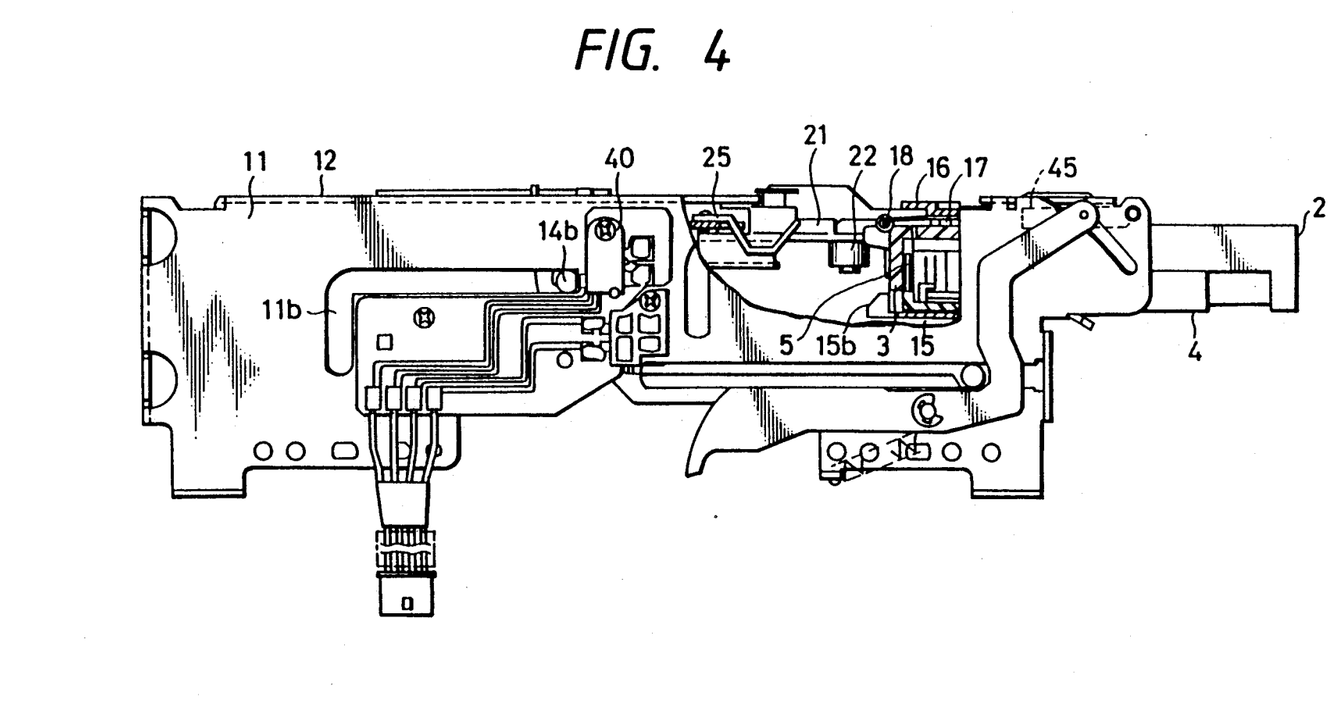
FIGS. 4 to 7 are partial sectional views of the cassette moving mechanism.
Figure 5:
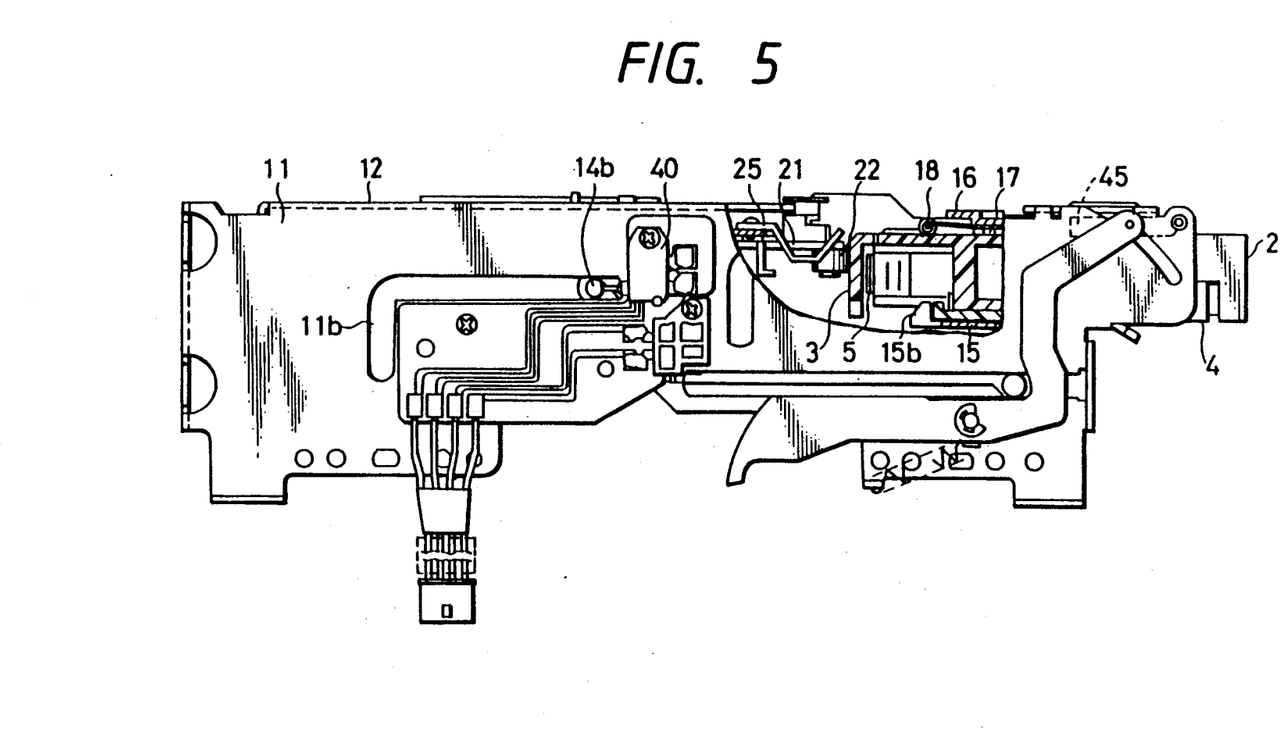

If the tape cassette 1 is inserted as shown in FIG. 4, the cassette causes a door 45, which is pivotally installed between the side chassis 11, to pivot. Then the cassette enters into the holder 14 of the cassette moving section 13, and is pushed toward the lower portion 15 by the action of the spring 17 attached to the upper portion 16. Due to the action of a lock releasing protrusion 15a installed on the lower portion 15, the slider lock claw 2b of the tape cassette 1 is pushed up toward the upper portion 16 and disengages from the first engaging hole 4a to make the slider 4 slidable. If the tape cassette 1 is inserted further as shown in FIG. 5, the slider 4 in a slidable state is pressed toward the opening 50a by the slider moving claw 15b. In effect, the slider 4 is slid to the rear of the tape cassette 1, and therefore, the lid 3 becomes movable, which would be impossible if the slider 4 were located at the front of the tape cassette 1.

Figure 6:
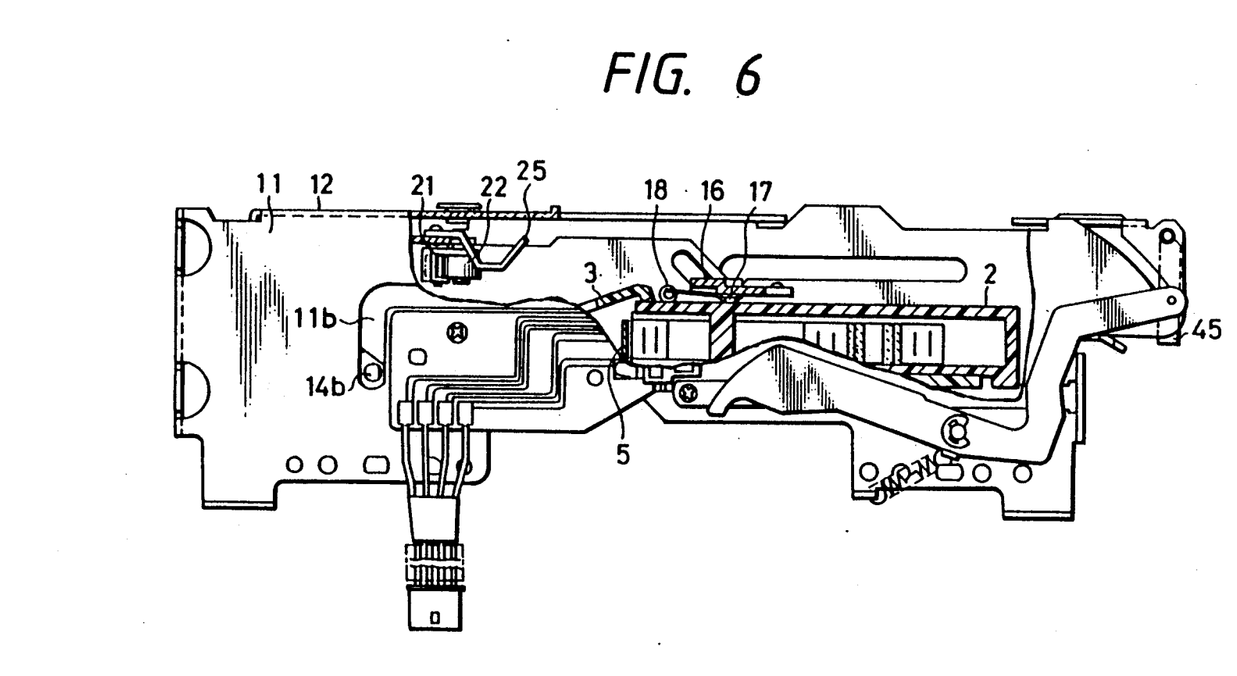

At the same time, the engaging roll 18 attached on the upper portion 16 engages the engaging groove 2a of the tape cassette 1, thereby securing the tape cassette 1 to the holder 14. When the tape cassette 1 is secured to the holder 14, the holder shaft 14b which ordinarily contacts the start switch 40, is separated from the start switch 40 in order to start the motor. This is accompanied by the moving of the holder shafts 14a and 14b of the cassette moving section 13 along the slots 11a and 11b of the side chassis 11. When the holder shafts 14a and 14b reach a central position in the parallel portion of the slots 11a and 11b, the lid 3 begins to pivot toward the top chassis. By the time the holder shafts reach the bottom of the transverse portion of the slots, the lid 3 is completely open, as shown in FIG. 6. When this state is detected by a sensor (not shown), the motor is stopped. When the motor is stopped, the magnetic tape is drawn from the tape cassette 1 in order to carry out operations such as recording and reproducing of audio signals.

When the tape cassette 1 is being inserted, if the push rolls 22 are pushed by the lid 3 as shown in FIGS. 4 and 5, the arms 21 attached to the second holder 20 pivot so that the push rolls 22 approach each other while contacting the lid 3. But when the holder shaft 14b is separated from the start switch 40, the motor begins revolving, and the push rolls 22 are separated from the lid 3. Then the tape cassette 1 moves with the holder 14 until it reaches a position where it can perform operations such as the recording of audio signals, etc., as shown in FIG. 6.

When the tape cassette 1 is being ejected, the arms 21 will pivot so that the push rolls 22 are separated, and thus, when the holder shaft 14b reaches a position where it pushes the start switch 40 as shown in FIG. 5, the lid 3 and the push rolls 22 are in contact. At that time, the tape cassette is forcibly pivoted by the action of the tension spring 23, and is ejected, as shown in FIG. 4. At the same time, the engagement between the engaging groove 2a and the engaging roll 18 at the upper portion 16, is released by the pushing force of the arms 21. Also accompanying the ejection of the tape cassette 1, the slider lock claw 2b is slid over the lock releasing protrusion 15a at the lower portion 15, and forced up, thereby releasing the engagement between the lock slider claw 2b and the second engaging hole 4b. Consequently, the slider 4 slides forward due to its inherent forward biasing force, thereby forming an engagement between the slider lock claw 2b and the first engaging hole 4a. The tape cassette 1 is in the same state both when it is inserted and when it is ejected.

However, if a tape cassette with a malfunctioning slider lock claw 2b is used, the slider 4 is always movable and therefore, the slider 4 can slide slightly forward depending on the type of tape cassette 1 used, and obstruct the pivoting of the lid 3. If this happens when the tape cassette 1 is being ejected, the lid 3 cannot be closed, thereby blocking the ejection of the tape cassette 1.

Figure 7:
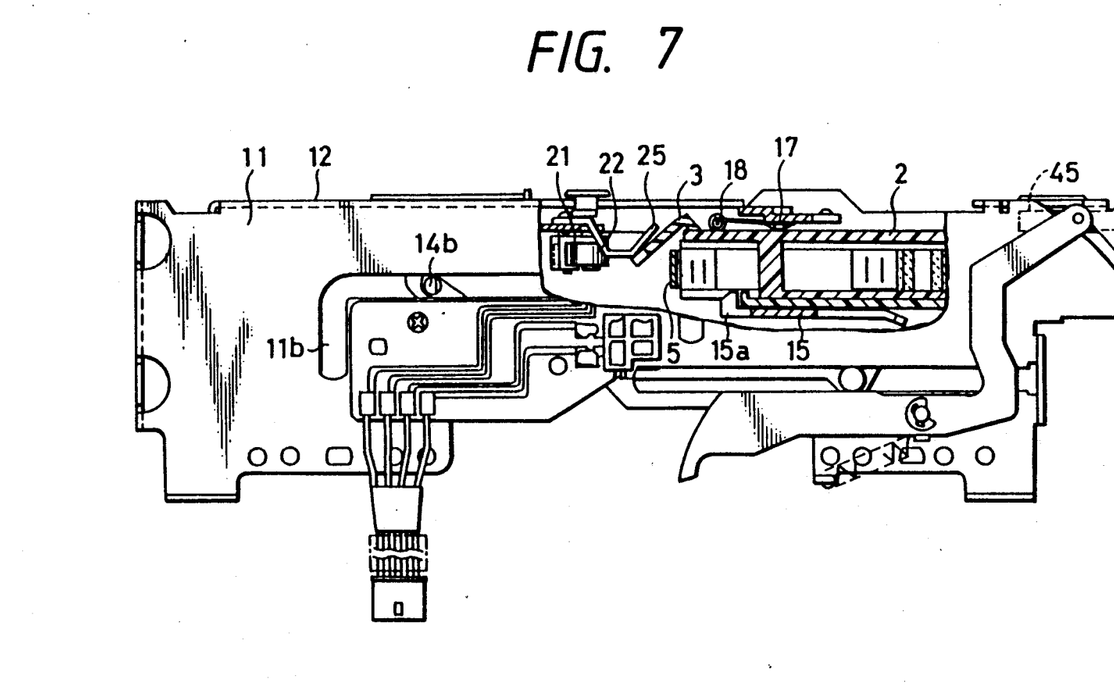

In order to prevent this situation, the lid closing device 25 is attached to the second holder 20, so that the lid closing device 25 functions as follows to close the lid 3 when the tape cassette 1 is being ejected. The tape cassette 1 moves toward the top chassis 12 together with the holder 14, as lid 3 is closed. If the slider lock claw 2b of the tape cassette 1 does not function properly, the slider 4 is slightly moved forward during the movement of the tape cassette 1 toward the top chassis 12, so that the lid 3 is not completely close. In this state, if the uppermost point of the slots 11a and 11b formed in the side chassis 11 is reached as shown in FIG. 7, the lid closing device 25 comes above the lid 3, after moving toward the door 45 at the same speed as that of the holder 14. Therefore, if the lid 3 is opened slightly more than a lid with a properly functioning slider lock claw 2b, the lid closing device 25 touches the lid 3, resulting in the lid 3 moving slightly toward closing. The slider 4, which was positioned forwardly and impeding the complete closing of the lid 3, is pushed rearwardly. Therefore, the obstruction of the lid closing is removed, resulting in that the lid 3 is completely closed. Therefore, any tape cassette with a defective slider lock claw 2b can be ejected in a normal manner.

With a cassette loading apparatus according to the present invention, even if a tape cassette with a malfunctioning slider lock claw is used and the slider becomes always slidable so that the lid cannot be completely closed during the ejection of the tape cassette, a lid closing device function to close the lid, thereby eliminating the situation in which the tape cassette can not be ejected due to an open lid. Accordingly, the present invention provides a digital audio tape player with a highly reliable performance.

I claim:

1. A cassette loading apparatus for a front-loading tape player, the cassette being of the type having an openable and closable lid, said apparatus comprising:
    a housing;
    holding means movably mounted on said housing for holding said tape cassette, and for moving said tape cassette from an insert position to an operative position and from an operative position to an eject position; and
    said holding means comprising:
    a first holder for moving said tape cassette from a holding position to said operative position and from said operative position to said holding position;
    a second holder interlockingly engaged with said first holder for moving said tape cassette from said insert position to said holding position, and from said holding position to said eject position; and
    means proximally located for forcibly closing said lid so as to allow said tape cassette to be moved into said eject position.

2. The apparatus according to claim 1 wherein said holding means comprises:
    first and second arms positioned at opposite sides of said second holder for ejecting said tape cassette.

3. The cassette loading apparatus according to claim 2, the cassette being of the type having a lockable lid, wherein said first holder comprises:
    an upper portion and a lower portion;
    a lock releasing protrusion for unlocking said lockable lid, thereby allowing said lid to be movable, said lock releasing protrusion being positioned on said lower portion of said first holder;
    a push member for pushing down said tape cassette, said push member being positioned on said upper portion of said first holder.

* * * * *